United States Patent
Winters et al.

(10) Patent No.: US 7,968,740 B2
(45) Date of Patent: Jun. 28, 2011

(54) PROCESS FOR PREPARING ORGANICALLY MODIFIED LAYERED DOUBLE HYDROXIDE

(75) Inventors: Robin Winters, Bemmel (NL); Elwin Schomaker, Arnhem (NL); Siebe Cornelis De Vos, Arnhem (NL); Marianne Frederika Reedijk, Ochten (NL); Johanna Henriëtte Zijtveld-Van Der Wiel, Baarn (NL)

(73) Assignee: Akzo Nobel N.V., Arnhem (NL)

( * ) Notice: Subject to any disclaimer, the term of this patent is extended or adjusted under 35 U.S.C. 154(b) by 517 days.

(21) Appl. No.: 12/096,433

(22) PCT Filed: Dec. 1, 2006

(86) PCT No.: PCT/EP2006/069204
§ 371 (c)(1),
(2), (4) Date: Aug. 11, 2008

(87) PCT Pub. No.: WO2007/065859
PCT Pub. Date: Jun. 14, 2007

(65) Prior Publication Data
US 2008/0293957 A1 Nov. 27, 2008

Related U.S. Application Data

(60) Provisional application No. 60/751,206, filed on Dec. 19, 2005.

(30) Foreign Application Priority Data

Dec. 6, 2005 (EP) .................................... 05111752

(51) Int. Cl.
*C07F 5/06* (2006.01)
(52) U.S. Cl. ....................................................... 556/182
(58) Field of Classification Search .................... 556/182
See application file for complete search history.

(56) References Cited

U.S. PATENT DOCUMENTS

| 5,518,704 A | 5/1996 | Kelkar et al. |
| 5,578,286 A | 11/1996 | Martin et al. |
| 5,728,364 A | 3/1998 | Martin et al. |
| 5,728,366 A | 3/1998 | Martin et al. |
| 6,706,249 B1 | 3/2004 | Komatsu et al. |
| 2003/0114699 A1 | 6/2003 | Brima et al. |

FOREIGN PATENT DOCUMENTS

| DE | 198 36 580 | 2/2000 |
| WO | WO 99/35185 | 7/1999 |
| WO | WO 00/09599 | 2/2000 |

OTHER PUBLICATIONS

Mark A. Drezdzon, "Synthesis of Isopolymetalate-Pillared Hydrotalcite via Organic-Anion-Pillared Precursors", *Inorganic Chemistry*, vol. 27, pp. 4628-4632, 1988.
Solates & Zinkel., "Chemistry of Rosin", *Navel Stores: Production Chemistry Utilization*, Chapter 9, pp. 261-331, 1989.
F. Cavani at al., "Hydrotalcite-Type Anionic Clays: Preparation, Properties and Applications", *Catalysis Today*,1 1, pp. 173-301, 1991.
Marlon Borja et al., "Fatty Acids in Layered Metal Hydroxides: Membrane-Like Structure and Dynamics", *The Journal of Physical Chemistry*, vol. 96, No. 13, pp. 5434-5444, 1992.
A.S. Bookin et al., "Polytype Diversity of the Hydrotalcite-Like Minerals II. Determination of the Polytypes of Experimentally Studied Varieties", *Clays and Clay Minerals*, vol. 41, No. 5, pp. 558-564, 1993.
Simon Carlino, "The Intercalation of Carboxylic acids into Layered Double Hydroxides: A Critical Evaluation and Review of the Different Methods", *Solid State Ionics*, vol. 98, pp. 73-84, 1997.
Jay B. Class, "Rosin and Modified Rosins: Resins, Natural", *Kirk-Othmer Encyclopedia of Chemical Technology*, Chapter 1, pp. 1-5, http://www.mrw.interscience.wiley.com/kirk/articles/resiclas.a01/sect2.html, online posting date Dec. 4, 2000.
International Search Report, PCT International Patent Application No. PCT/EP2006/069204, dated Mar. 8, 2007.

*Primary Examiner* — Porfirio Nazario Gonzalez
(74) *Attorney, Agent, or Firm* — Kenyon & Kenyon LLP

(57) ABSTRACT

A process is disclosed for preparing an organically modified layered double hydroxide having a distance between the individual layers of the layered double hydroxide of about 1.5 nm and comprising an organic anion as charge-balancing anion, the process comprising the steps of: (a) preparing a precursor suspension comprising a divalent metal ion source and a trivalent metal ion source; (b) solvothermally treating the precursor suspension to obtain a double layered hydroxide, wherein an organic anion is added before or during the formation of the layered double hydroxide of step (b), or following the formation of the layered double hydroxide, so as to obtain the organically modified layered double hydroxide, with the proviso that deoxycholic acid is not the sole organic anion.

20 Claims, No Drawings

PROCESS FOR PREPARING ORGANICALLY MODIFIED LAYERED DOUBLE HYDROXIDE

REFERENCE TO RELATED APPLICATION(S)

This application is the U.S. National Phase of PCT/EP2006/069204 filed on Dec. 1, 2006 and claims the benefit of U.S. Provisional Application No. 60/751,206 filed on Dec. 19, 2005.

The invention relates to a process for preparing organically modified layered double hydroxides.

Such processes are known in the art.

WO 99/35185 discloses a process for preparing organically modified layered double hydroxides (LDHs) where the organic anion is introduced into the LDH via ion exchange. The ion exchange is carried out by suspending the LDH in water, after which the pH of the suspension is reduced to a value of less than 4. Next the organic anions are added to the suspension and the pH is adjusted to a value in excess of 8. This process is rather complex and generally renders a salt-containing waste stream.

WO 00/09599 describes the preparation of LDH comprising organic anions as intercalating anions. These modified LDHs can be prepared in various ways, with use being made of the salts of divalent and trivalent metal ions, such as the chloride salts of magnesium and aluminium or sodium aluminate. The processes described in WO 00/09599 require salts which will at least partially end up in the waste stream, which is undesirable. It is further noted that the salts used in these processes are relatively expensive.

All in all, the economics of the above-described processes show up a need for processes that are more attractive economically and more environment-friendly.

It is therefore an object of the present invention to provide a simpler and more environment-friendly process for preparing organically modified layered double hydroxides.

This object is achieved with a process for preparing an organically modified layered double hydroxide having a distance between the individual layers of the layered double hydroxide of above 1.5 nm and comprising an organic anion as charge-balancing anion, the process comprising the steps of:
  (a) preparing a precursor suspension comprising a divalent metal ion source and a trivalent metal ion source;
  (b) solvothermally treating the precursor suspension to obtain the layered double hydroxide,
wherein an organic anion is added before or during the formation of the layered double hydroxide of step (b), or following the formation of the layered double hydroxide, so as to obtain the organically modified layered double hydroxide, with the proviso that deoxycholic acid is not the sole organic anion.

This object is also achieved with a process for preparing an organically modified layered double hydroxide having a distance between the individual layers of the layered double hydroxide of above 1.5 nm and comprising an organic anion as charge-balancing anion, the process comprising the steps of:
  (a) preparing a precursor suspension comprising a divalent metal ion source and a trivalent metal ion source;
  (b) thermally treating the precursor suspension to obtain the layered double hydroxide,
wherein an organic anion is added before or during the formation of the layered double hydroxide of step (b), or following the formation of the layered double hydroxide, so as to obtain the organically modified layered double hydroxide, with the proviso that in step a) the trivalent metal ion source is not reacted with the organic anion at a temperature of between 60 and 85° C. for 4 to 8 hours prior to the addition of the divalent metal ion source and step b) is subsequently carried out at a temperature of 90 to 95° C. for 4 to 8 hours.

The divalent metal ion source and the trivalent metal ion source used in the processes of the present invention are not salts of these metal ions, in particular these sources are not chloride or perchlorate salts of the divalent and trivalent metal ions, or if the trivalent metal ion is aluminium, aluminates. It is noted that these sources may dissolve partially in the suspending medium.

The divalent and trivalent metal ion sources generally are oxides or hydroxides of the divalent or trivalent metal ions. Examples of divalent metal ions are $Zn^{2+}$, $Mn^{2+}$, $Ni^{2+}$, $Co^{2+}$, $Fe^{2+}$, $Cu^{2+}$, $Sn^{2+}$, $Ba^{2+}$, $Ca^{2+}$, and $Mg^{2+}$ Examples of trivalent metal ions are $Al^{3+}$, $Cr^{3+}$, $Fe^{3+}$, $Co^{3+}$, $Mn^{3+}$, $Ni^{3+}$, $Ce^{3+}$ and $Ga^{3+}$. It is also contemplated to use three or more different metal ions in the layered double hydroxide prepared with the process of the invention. Of these metal ions the combination of $Mg^{2+}$ and/or $Zn^{2+}$ and $Al^{3+}$ is preferred. Examples of suitable magnesium sources include magnesium oxide, magnesium hydroxide, magnesium hydroxycarbonate, magnesium bicarbonate, dolomite, and sepiolite. Magnesium oxide is preferred. A combination of two or more magnesium sources is also contemplated. The aluminium source typically is a hydroxide or an oxide of aluminium. Examples of such an aluminium source are aluminium trihydroxide such as gibbsite and bayerite, aluminium oxohydroxides such as boehmite, diaspore or goethite, and transition aluminas, which are known to the man skilled in the art.

The use of the above divalent metal ion and trivalent metal ion sources in the process of the invention provides a process that is more environment-friendly, as considerably less salt—if any—remains in the waste stream resulting from the process. Moreover, the divalent and trivalent metal ion sources, and in particular the magnesium and aluminium sources, generally are less expensive than the corresponding salts commonly used in the production of layered double hydroxides. In addition, the process of the invention generally is simpler, as it requires fewer steps and/or does not require an after-treatment of the waste stream. Furthermore, these processes may be performed in a much shorter time, which in turn may lead to a higher production rate of the organically modified layered double hydroxide compared to conventional processes.

In one embodiment of the process of the invention the divalent metal ion source and/or the trivalent metal ion source is activated before the suspension comprising both sources is thermally or solvothermally treated. The term "activated" refers to activation of the divalent and/or trivalent metal ion sources, thus increasing their reactivity in the process; such activation can be performed for example by dry or wet milling and/or by acid treatment. A further advantage of activation of the metal ion sources is that significantly fewer impurities, such as brucite or gibbsite, are formed during the process. The reduction or absence of such impurities in the product obtained with this process has the additional advantage that the use of the product in polymeric matrices may lead to the resulting composite material having improved dynamic and/or mechanical properties.

The organically modified layered double hydroxides prepared with the process of the invention have a distance between the individual layers of above 1.5 nm. This has advantages in the use of these organically modified layered double hydroxides, e.g. if used in polymeric matrices. In polymeric matrices (e.g. in nanocomposite materials or coating compositions) the larger interlayer distance renders the layered double hydroxides of the invention easily processable in the polymeric matrix, and it further enables easy delamination and/or exfoliation of the layered double hydroxide, resulting in a mixture of the modified layered double hydroxide and the polymer matrix with improved physical properties. Preferably, the distance between the layers in an LDH according to the invention is at least 1.5 nm, more preferably at least 1.6 nm, even more preferably at least 1.8 nm, and most preferably at least 2 nm. The distance between the individual layers can be determined using X-ray diffraction and transmission electron microscopy (TEM), as outlined below.

In a preferred embodiment of the present invention, the divalent and/or trivalent metal ion sources, and in particular the magnesium and/or aluminium sources, are milled or activated prior to step (b). In the processes of the invention the divalent and/or trivalent metal ion sources generally have a d50 value of less than 20 μm and a d90 value of less than 50 μm. Preferably, the d50 value is less than 15 μm and the d90 value is less than 40 μm, more preferably the d50 value is less than 10 μm and the d90 value is less than 30 μm, even more preferably the d50 value is less than 8 μm and the d90 value is less than 20 μm, and most preferably the d50 value is less than 6 μm and the d90 value is less than 10 μm. The particle size distribution can be determined using methods known to the man skilled in the art, e.g. laser diffraction in accordance with DIN 13320. This milling step allows the formation of the layered double hydroxide to proceed faster. It further may reduce the amount of impurities such as gibbsite or brucite if the divalent and trivalent metal ion sources are magnesium and aluminium sources.

In the context of the present application the terms "thermal treatment" and "thermally" refer to the treatment of the precursor suspension at a temperature from 30° C. to the boiling point of the precursor suspension at atmospheric pressure. If the suspending medium is water, the temperature of the thermal treatment generally is from 30° C. to 100° C., preferably from 40° C. to 95° C., and most preferably from 50° C. to 90° C.

Additionally, the terms "solvothermal treatment" and "solvothermally" refer to the treatment of the precursor suspension at a pressure above atmospheric pressure and a temperature which generally is above the boiling point of the precursor suspension at atmospheric pressure. The pressure generally is from 1 bar to 200 bar, preferably from 2 bar to 150 bar, and most preferably from 3 bar to 100 bar. If the suspending medium is water, the temperature generally is 100° C. or higher, preferably from 100° C. to 300° C., more preferably from 110° C. to 250° C., and most preferably from 120° C. to 200° C.

The suspending media suitable for both thermal and solvothermal treatments may be water, an organic solvent or mixtures thereof. Suitable examples of organic solvents include alcohols such as methanol, ethanol, 1-propanol, and isopropanol, and alkanes such as pentane, hexane, and heptane, and aromatic hydrocarbons such as benzene, toluene, and xylene. A particularly suitable solvent for the processes of the invention is water.

The process of the invention can be conducted in the absence of $CO_2$ or any carbonate in the precursor suspension, so as to ascertain that no carbonate is incorporated into the layered double hydroxide as charge-balancing anion. This furthermore allows the organic anion to be incorporated into the layered double hydroxide as charge-balancing anion.

In one embodiment of the invention, the organic anion is added to the precursor suspension before or while step (b) proceeds. In this way, the organically modified layered double hydroxide is prepared in one step, which generally renders the process simpler and quicker, and consequently more attractive economically.

Alternatively, the organic anion is added after the formation of the layered double hydroxide, in which case the layered double hydroxide comprises mainly hydroxyl as charge-balancing anion. Said hydroxyl as charge-balancing anion can be easily exchanged by the organic anion.

Within the context of the present application the term "charge-balancing anion" refers to anions that compensate for the electrostatic charge deficiencies of the crystalline LDH sheets. As the LDH typically has a layered structure, the charge-balancing anions may be situated in the interlayer, on the edge or on the outer surface of the stacked LDH layers. Such anions situated in the interlayer of stacked LDH layers are referred to as intercalating ions.

Such a stacked LDH or organoclay may also be delaminated or exfoliated, e.g. in a polymeric matrix. Within the context of the present specification the term "delamination" is defined as a reduction of the mean stacking degree of the LDH particles by at least partial de-layering of the LDH structure, thereby yielding a material containing significantly more individual LDH sheets per volume. The term "exfoliation" is defined as complete delamination, i.e. disappearance of periodicity in the direction perpendicular to the LDH sheets, leading to a random dispersion of individual layers in a medium, thereby leaving no stacking order at all.

Swelling or expansion of the LDHs, also called intercalation of the LDHs, can be observed with X-ray diffraction (XRD), because the position of the basal reflections—i.e. the d(00l) reflections—is indicative of the distance between the layers, which distance increases upon intercalation.

Reduction of the mean stacking degree can be observed as a broadening, up to disappearance, of the XRD reflections or by an increasing asymmetry of the basal reflections (00l).

Characterization of complete delamination, i.e. exfoliation, remains an analytical challenge, but may in general be concluded from the complete disappearance of non-(hk0) reflections from the original LDH.

The ordering of the layers and, hence, the extent of delamination, can further be visualized with transmission electron microscopy (TEM).

The LDH of the invention may be any LDH known to the man skilled in the art. Typically, these LDHs are mineral LDHs which are able to expand or swell. Such LDHs have a layered structure comprising charged crystalline sheets (also referred to as individual LDH layers) with charge-balancing anions sandwiched in between. The terms "expand" and "swell" within the context of the present application refer to an increase in the distance between the charged crystalline sheets. Expandable LDHs can swell in suitable solvents, e.g. water, and can be further expanded and modified by exchanging the charge-balancing ions with other (organic) charge-balancing ions, which modification is also known in the art as intercalation.

The organically modified layered double hydroxides of the invention have a layered structure corresponding to the general formula:

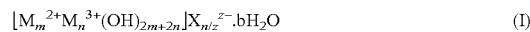

$$[M_m^{2+}M_n^{3+}(OH)_{2m+2n}]X_{n/z}^{z-} \cdot bH_2O \quad (I)$$

wherein $M^{2+}$ is a divalent metal ion such as $Zn^{2+}$, $Mn^{2+}$, $Ni^{2+}$, $Co^{2+}$, $Fe^{2+}$, $Cu^{2+}$, $Sn^{2+}$, $Ba^{2+}$, $Ca^{2+}$, $Mg^{2+}$, $M^{3+}$ is a trivalent metal ion such as $Al^{3+}$, $Cr^{3+}$, $Fe^{3+}$, $Co^{3+}$, $Mn^{3+}$, $Ni^{3+}$, $Ce^{3+}$, and $Ga^{3+}$, m and n have a value such that m/n=1 to 10, and b has a value in the range of from 0 to 10. X is a charge-balancing organic anion having at least 8 carbon atoms, or any other anion known to the man skilled in the art, as long as at least part of the intercalating ions is the organic anion having at least 8 carbon atoms.

Examples of other anions known in the art include hydroxide, carbonate, bicarbonate, nitrate, chloride, bromide, sulfonate, sulfate, bisulfate, vanadates, tungstates, borates, phosphates, pillaring anions such as $HVO_4^-$, $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $B_4O_5(OH)_4^{2-}$, $[B_3O_3(OH)_4]^-$, $[B_3O_3(OH)_5]^{2-}$ $HBO_4^{2-}$, $HGaO_3^{2-}$, $CrO_4^{2-}$, and Keggin-ions.

The LDH of the invention includes hydrotalcite and hydrotalcite-like anionic LDHs. Examples of such LDHs are hydrotalcite and hydrotalcite-like materials, meixnerite, manasseite, pyroaurite, sjögrenite, stichtite, barberonite, takovite, reevesite, and desautelsite. A preferred LDH is hydrotalcite, which is an LDH having a layered structure corresponding to the general formula:

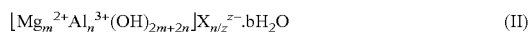

$$[Mg_m^{2+}Al_n^{3+}(OH)_{2m+2n}]X_{n/z}^{z-}\cdot bH_2O \qquad (II)$$

wherein m and n have a value such that m/n=1 to 10, preferably 1 to 6, and b has a value in the range of from 0 to 10, generally a value of 2 to 6, and often a value of about 4. X is a charge-balancing ion as defined above.

It is preferred that m/n should have a value of 2 to 4, more particularly a value close to 3.

The LDH may be in any crystal form known in the art, such as described by Cavani et al. (*Catalysis Today*, 11 (1991), pp. 173-301) or by Bookin et al. (*LDHs and LDH Minerals*, (1993), Vol. 41(5), pp. 558-564). If the LDH is a hydrotalcite, the hydrotalcite may be a polytype having $3H_1$, $3H_2$, $3R_1$ or $3R_2$ stacking, for example.

The organic anion used in the process of the invention can be any organic anion that upon intercalation renders an organically modified layered double hydroxide in accordance with the invention. The organic anion which can be suitably used in the process can be derived from a salt or an acid of the organic anion. Use of a salt-derived organic anion such as an alkali metal salt of stearate can be advantageous due to its higher solubility in the solvent compared to the corresponding acid-derived organic anion. Alternatively, use of an acid-derived organic anion can be advantageous as salt ions will not be introduced into the waste stream, so that the waste stream does not need additional treatments to remove the salt ions, rendering the process cheaper and simpler.

The organic anion suitable in the process of the invention generally comprises 8 or more carbon atoms, with the proviso that the only organic anion present as charge-balancing anion is not terephthalate. Such organic anions having at least 8 carbon atoms include mono-, di- or polycarboxylates, sulfonates, phosphonates, and sulfates. Preferably, the organic anion comprises at least 10 carbon atoms, more preferably at least 12 carbon atoms, and the organic anion comprises at most 1,000 carbon atoms, preferably at most 500 carbon atoms, more preferably at most 100 carbon atoms, even more preferably at most 50 carbon atoms, and most preferably at most 20 carbon atoms. It is envisaged to use 2 or more organic anions, at least one of which has at least 8 carbon atoms, and the resulting LDH has an interlayer distance of at least 1.5 nm; one of the other organic anions may thus have less than 8 carbon atoms. The organically modified LDHs comprising only one charge-balancing organic anion selected from the group consisting of acetate, succinate, benzoate, and terephthalate are less preferred, as they have an interlayer distance of less than 1.5 nm and generally are not easily exfoliated or delaminated in polymeric matrices, rendering these modified LDHs less suitable for use in nanocomposite materials or coating compositions, for instance. Examples of such organically modified LDHs are given in U.S. Pat. No. 5,728,366. Additionally, having deoxycholic acid as the sole organic anion is also less preferred, as it is too expensive. Moreover, deoxycholic acid contains 2 hydroxyl groups, which may render exfoliation or delamination in a polymeric matrix very difficult or even impossible. It is believed that this is caused by a sort of pillaring behaviour due to interaction between two or more intercalated deoxycholic acid anions or due to a single deoxycholic acid anion interacting with two different clay platelets. In one embodiment of the present invention it is desired that deoxycholic acid is not used as charge-balancing anion.

It is further contemplated that the charge-balancing organic anion comprises one or more functional groups such as hydroxyl, amine, carboxylic acid, and vinyl. If such organically modified LDHs are used in polymeric matrices, these functional groups may interact or react with the polymer.

Suitable examples of organic anions of the invention are monocarboxylic acids such as fatty acids and rosin-based ions.

In one embodiment, the organic anion is a fatty acid or a salt thereof having from 8 to 22 carbon atoms. Such a fatty acid may be a saturated or unsaturated fatty acid. Suitable examples of such fatty acids are caprylic acid, capric acid, lauric acid, myristic acid, palmitic acid, stearic acid, arachidic acid, decenoic acid, palmitoleic acid, oleic acid, linoleic acid, linolenic acid, and mixtures thereof.

In another embodiment of the present invention, the organic anion is rosin or a salt thereof. Rosin is derived from natural sources, is readily available, and is relatively inexpensive compared to synthetic organic anions. Typical examples of natural sources of rosin are gum rosin, wood rosin, and tall oil rosins. Rosin commonly is a suspension of a wide variety of different isomers of monocarboxylic tricyclic rosin acids usually containing about 20 carbon atoms. The tricyclic structures of the various rosin acids differ mainly in the position of the double bonds. Typically, rosin is a suspension of substances comprising levopimaric acid, neoabietic acid, palustric acid, abietic acid, dehydroabietic acid, seco-dehydroabietic acid, tetrahydroabietic acid, dihydroabietic acid, pimaric acid, and isopimaric acid. Rosin derived from natural sources also includes rosins, i.e. rosin suspensions, modified notably by polymerization, isomerization, disproportionation, hydrogenation, and Diels-Alder reactions with acrylic acid, anhydrides, and acrylic acid esters. The products obtained by these processes are referred to as modified rosins. Natural rosin may also be chemically altered by any process known in the art, such as for example reaction of the carboxyl group on the rosin with metal oxides, metal hydroxides or salts to form rosin soaps or salts (so-called resinates). Such chemically altered rosins are referred to as rosin derivatives.

Such rosin can be modified or chemically altered by introducing an organic group, an anionic group or a cationic group. The organic group may be a substituted or unsubstituted aliphatic or aromatic hydrocarbon having 1 to 40 carbon atoms. The anionic group may be any anionic group known to the man skilled in the art, such as a carboxylate or a sulfonate.

Further details of these rosin-based materials can be gleaned from D. F. Zinkel and J. Russell (in *Naval Stores, production-chemistry-utilization*, 1989, New York, Section II, Chapter 9) and J. B. Class ("Resins, Natural," Chapter 1: "Rosin and Modified Rosins," *Kirk-Othmer Encyclopedia of Chemical Technology*, online posting date: Dec. 4, 2000).

It is also contemplated to use LDHs of the invention comprising one or more organic anions. In one embodiment, the intercalating anions are a mixture of fatty acid and rosin.

Generally, at least 10% of the total amount of intercalating ions in the LDH types according to the invention is an organic anion, preferably at least 30%, more preferably at least 60%, and most preferably at least 90% of the total amount of intercalating ions is an organic anion. In a preferred embodiment, at least 10% of the total amount of intercalating anions is a fatty acid-derived or a rosin-based anion or a suspension of both anions, preferably at least 30%, more preferably at least 60%, and most preferably at least 90% of the total amount of intercalating ions is a fatty acid-derived or a rosin-based anion or a mixture of both anions.

The present invention is further illustrated in the Examples below.

EXAMPLES

Example 1

A commercially available fatty acid was used as received. The Kortacid® PH05, a blend of palmitic and stearic acid, was supplied by Oleochemicals GmbH, a company of Akzo Nobel Chemicals.

50 grams of magnesium oxide (Zolitho® 40, ex Martin Marietta Magnesia Specialties LLC) and 39 grams of aluminium trihydroxide (Alumill F505) were mixed in 648 grams of demineralized water and ground to an average particle size ($d_{50}$) of 2.5 µm. The slurry was fed to an oil-heated autoclave equipped with a high-speed stirrer and heated to 80° C. Then 102 grams of Kortacid® PH05 were added to the autoclave over a period of 15 minutes. Before addition, the fatty acid blend was heated to 80° C. After the acid addition, the autoclave was closed and heated to 170° C. and kept there for 1 hour. Then the autoclave was cooled to about 40° C. and the resulting slurry was removed. The slurry was then centrifuged at 2,000 rpm for about 10 minutes. The liquid was decanted and the solids were dried under vacuum in an oven overnight at 80° C.

The resulting hydrotalcite-like clay comprising the fatty acids blend was analyzed with X-ray diffraction to determine the inter-gallery spacing or d-spacing. The XRD pattern of the hydrotalcite-like clay as prepared above shows minor hydrotalcite-related non-(hk0) reflections, indicating intercalation of the anionic clay. The intercalate exhibits a characteristic d(00I) value of 29 A.

Example 2

A stabilized rosin was produced in-house by melting Chinese gum rosin and heating it to 235° C. During melting 3.5% Vultac®-2 (Arkema Inc.) by weight on rosin was added. The molten rosin was stirred at 235° C. for 15 hrs, after which the resin was cooled and ready for use.

50 grams of magnesium oxide (Zolitho® 40, ex Martin Marietta Magnesia Specialties LLC) and 39 grams of aluminium trihydroxide (Alumill F505) were mixed in 648 grams of demineralized water and ground to an average particle size ($d_{50}$) of 2.5 µm. The slurry was fed to an oil-heated autoclave equipped with a high-speed stirrer and after its closing heated to 120° C. Then 115 grams of stabilized rosin as prepared above were added to the autoclave over a period of 30 minutes. Before addition, the rosin blend was also heated to 120° C. After the acid addition, the autoclave was heated to 170° C. and kept there for 1 hour. Then the autoclave was cooled to about 40° C. and the resulting slurry was removed. The slurry was then centrifuged at 2,000 rpm for about 10 minutes. The liquid was decanted and the solids were dried under vacuum in an oven overnight at 80° C.

The resulting hydrotalcite-like clay comprising the fatty acids blend was analyzed with X-ray diffraction to determine the inter-gallery spacing or d-spacing. The XRD pattern of the hydrotalcite-like clay as prepared above shows minor hydrotalcite-related non-(hk0) reflections, indicating intercalation of the anionic clay. The intercalate exhibits a characteristic d(00I) value of 23 Å.

Example 3

252 grams of magnesium oxide (Zolitho® 40, ex Martin Marietta Magnesia Specialties LLC) and 240 grams of aluminium trihydroxide (Alumill F505) were mixed in 3,513 grams of demineralized water and ground to an average particle size ($d_{50}$) of 2.4 pm. Part of this slurry (704 grams) was fed to a glass reactor equipped with a stirrer, nitrogen flow, and a reflux cooler. The slurry was heated to 90° C. Then 147 grams of molten Kortacid PH05 (T=90° C.) were added to the glass reactor over a period of 90 minutes. The reaction mixture was kept at 90° C. for another 19 hrs and then cooled below 50° C. The resulting slurry was then centrifuged at 2,000 rpm for about 10 minutes. The liquid was decanted and the solids were dried under vacuum in an oven overnight at 80° C.

The resulting hydrotalcite-like clay comprising the fatty acids blend was analyzed with X-ray diffraction to determine the inter-gallery spacing or d-spacing. The XRD pattern of the hydrotalcite-like clay as prepared above shows minor hydrotalcite-related non-(hk0) reflections, indicating intercalation of the anionic clay. The intercalate exhibits a characteristic d(00I) value of 28 Å.

The invention claimed is:

1. A process for preparing an organically modified layered double hydroxide having a distance between the individual layers of above 1.5 nm and comprising an organic anion as a charge-balancing anion, the process comprising the steps of:
    (a) preparing a precursor suspension comprising a divalent metal ion source and a trivalent metal ion source;
    (b) solvothermally treating the precursor suspension to obtain a layered double hydroxide,
        wherein an organic anion is added before or during the formation of the layered double hydroxide of step (b), or following the formation of the layered double hydroxide, so as to obtain the organically modified layered double hydroxide, and wherein the organic anion has 8 or more carbon atoms, with the proviso that deoxycholic acid is not the sole organic anion.

2. A process for preparing an organically modified layered double hydroxide having a distance between the individual layers of above 1.5 nm and comprising an organic anion as a charge-balancing anion, the process comprising the steps of:
    (a) preparing a precursor suspension comprising a divalent metal ion source and a trivalent metal ion source;
    (b) thermally treating the precursor suspension to obtain a layered double hydroxide,
        wherein an organic anion is added before or during the formation of the layered double hydroxide of step (b), or following the formation of the layered double hydroxide, so as to obtain the organically modified layered double hydroxide, and wherein the organic anion has 8 or more carbon atoms, with the proviso that in step a) the trivalent metal ion source is not reacted with the organic anion at a temperature of between 60 and 85° C. for 4 to 8 hours prior to the addition of the divalent metal ion source and step b) is subsequently carried out at a temperature of 90 to 95° C. for 4 to 8 hours.

3. The process according to claim 1 wherein the organic anion is added to the precursor suspension before step (b) proceeds.

4. The process according to claim 1 wherein the organic anion is added following the formation of the layered double hydroxide, wherein the layered double hydroxide has mainly hydroxyl as the charge-balancing anion.

5. The process according to claim 1 wherein the divalent metal ion is $Mg^{2+}$ and the trivalent metal ion is $Al^{3+}$.

6. The process according to claim 1 wherein at least one of the divalent metal ion source and/or the trivalent metal ion source is milled prior to step (b), the d50 value of the at least one of the divalent metal ion source and the trivalent metal ion source being below 10 μm.

7. The process according to claim 1 wherein the organic anion has from 10 to 40 carbon atoms, with the proviso that the only organic anion present as charge-balancing anion is not terephthalate.

8. The process according to claim 2 wherein the organic anion is added to the precursor suspension before step (b) proceeds.

9. The process according to claim 2 wherein the organic anion is added following the formation of the layered double hydroxide, wherein the layered double hydroxide has mainly hydroxyl as the charge-balancing anion.

10. The process according to claim 2 wherein the divalent metal ion is $Mg^{2+}$ and the trivalent metal ion is $Al^{3+}$.

11. The process according to claim 3 wherein the divalent metal ion is $Mg^{2+}$ and the trivalent metal ion is $Al^{3+}$.

12. The process according to claim 4 wherein the divalent metal ion is $Mg^{2+}$ and the trivalent metal ion is $Al^{3+}$.

13. The process according to claim 2 wherein at least one of the divalent metal ion source and the trivalent metal ion source is milled prior to step (b), the d50 value of the at least one of the divalent metal ion source and the trivalent metal ion source being below 10 μm.

14. The process according to claim 3 wherein at least one of the divalent metal ion source and the trivalent metal ion source is milled prior to step (b), the d50 value of the at least one of the divalent metal ion source and the trivalent metal ion source being below 10 μm.

15. The process according to claim 4 wherein at least one of the divalent metal ion source and the trivalent metal ion source is milled prior to step (b), the d50 value of the at least one of the divalent metal ion source and the trivalent metal ion source being below 10 μm.

16. The process according to claim 5 wherein at least one of the divalent metal ion source and the trivalent metal ion source is milled prior to step (b), the d50 value of the at least one of the divalent metal ion source and the trivalent metal ion source being below 10 μm.

17. The process according to claim 2 wherein the organic anion has from 10 to 40 carbon atoms, with the proviso that the only organic anion present as charge-balancing anion is not terephthalate.

18. The process according to claim 4 wherein the organic anion has from 10 to 40 carbon atoms, with the proviso that the only organic anion present as charge-balancing anion is not terephthalate.

19. The process according to claim 5 wherein the organic anion has from 10 to 40 carbon atoms, with the proviso that the only organic anion present as charge-balancing anion is not terephthalate.

20. The process according to claim 6 wherein the organic anion has from 10 to 40 carbon atoms, with the proviso that the only organic anion present as charge-balancing anion is not terephthalate.

* * * * *